US012658531B2

(12) United States Patent
Uchida et al.

(10) Patent No.: US 12,658,531 B2
(45) Date of Patent: Jun. 16, 2026

(54) BUSBAR AND BATTERY PACK INCLUDING THE SAME

(71) Applicant: PRIME PLANET ENERGY & SOLUTIONS, INC., Tokyo (JP)

(72) Inventors: Yozo Uchida, Toyota (JP); Yuki Sato, Toyota (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 555 days.

(21) Appl. No.: 18/137,165

(22) Filed: Apr. 20, 2023

(65) Prior Publication Data

US 2023/0344087 A1 Oct. 26, 2023

(30) Foreign Application Priority Data

Apr. 25, 2022 (JP) ................................ 2022-071277

(51) Int. Cl.

| | |
|---|---|
| ***H01R 25/14*** | (2006.01) |
| ***B23K 103/18*** | (2006.01) |
| ***H01M 50/503*** | (2021.01) |
| ***H01M 50/507*** | (2021.01) |
| ***H01R 25/16*** | (2006.01) |

(52) U.S. Cl.

CPC ....... *H01M 50/503* (2021.01); *H01M 50/507* (2021.01); *H01R 25/161* (2013.01)

(58) Field of Classification Search

CPC ............. H01M 50/503; H01M 50/507; H01M 50/502; H01M 50/514; H01M 50/209; H01M 50/51; H01M 50/516; H01M 50/522; H01R 25/161; H01R 25/145; Y02E 60/10; B23K 26/20; B23K 2103/18

USPC .......................................................... 429/158

See application file for complete search history.

(56) References Cited

U.S. PATENT DOCUMENTS

| | | | | |
|---|---|---|---|---|
| 10,193,107 B2 | 1/2019 | Tsutsumi et al. | | |
| 10,847,776 B2 | 11/2020 | Hashizawa et al. | | |
| 2001/0012736 A1 | 8/2001 | Miyajima et al. | | |
| 2013/0122345 A1* | 5/2013 | Sato | H01M 50/571 29/25.03 |
| 2014/0216814 A1* | 8/2014 | Suzuki | H01M 50/503 174/84 C |
| 2016/0114429 A1 | 4/2016 | Shioga et al. | | |
| 2018/0069227 A1* | 3/2018 | Maeda | H01M 50/562 |
| 2020/0106075 A1* | 4/2020 | Yanagida | H01M 50/505 |

(Continued)

FOREIGN PATENT DOCUMENTS

| | | |
|---|---|---|
| JP | 11-187542 A | 7/1999 |
| JP | H 11297373 A | 10/1999 |
| JP | 2010-148171 A | 7/2010 |

(Continued)

*Primary Examiner* — Christian Roldan

(74) *Attorney, Agent, or Firm* — Finnegan, Henderson, Farabow, Garrett and Dunner, LLP

(57) ABSTRACT

A busbar disclosed herein includes: a first metallic member including a first plate portion; a second metallic member including a second plate portion; a swaged joint formed by plastically deforming the first plate portion of the first metallic member and the second plate portion of the second metallic member such that the first plate portion and the second plate portion are swaged together; and a metal joint formed by metal-joining the first plate portion of the first metallic member to the second plate portion of the second metallic member.

10 Claims, 2 Drawing Sheets

(56) References Cited

U.S. PATENT DOCUMENTS

| | | | | |
|---|---|---|---|---|
| 2022/0149487 | A1* | 5/2022 | Tanaka ..................... | H01B 1/02 |

FOREIGN PATENT DOCUMENTS

| | | | |
|---|---|---|---|
| JP | 2015-187910 | A | 10/2015 |
| JP | 2015-211981 | A | 11/2015 |
| JP | 2019-067762 | A | 4/2019 |
| WO | WO 2020/183817 | A1 | 9/2020 |

* cited by examiner

BUSBAR AND BATTERY PACK INCLUDING THE SAME

CROSS REFERENCE TO RELATED APPLICATION

This application claims the benefit of priority to Japanese Patent Application No. 2022-071277 filed on Apr. 25, 2022. The entire contents of this application are hereby incorporated herein by reference.

BACKGROUND OF THE DISCLOSURE

1. Field

The present application relates to busbars and battery packs including the busbars.

2. Background

As is known in the art, battery packs each including a plurality of batteries (or cells) electrically connected to each other for higher outputs have widely been used as, for example, vehicle driving power sources. Such battery packs each include a plurality of batteries whose electrode terminals are electrically connected to each other through busbars. Techniques related to such battery packs are disclosed in, for example, JP 2015-211981 A and JP 11-297373 A. The technique disclosed in JP 2015-211981 A involves joining dissimilar metals (i.e., copper and aluminum) by using laser so as to provide a dissimilar metal joint structure (i.e., a busbar) including a metal fused portion. The technique disclosed in JP 11-297373 A involves riveting a tab terminal to a busbar (which is to be housed in an electric connection box for an automobile) at a first position and laser-welding the tab terminal to the busbar at a second position different from the first position.

SUMMARY

Studies conducted by the inventors of the present application, however, suggest that the technique disclosed in JP 2015-211981 A unfortunately forms many fragile intermetallic compounds as a result of joining dissimilar metals. Thus, application of external force, such as vibrations and/or an impact, during battery use may break the metal fused portion. This may result in an unstable conductive connection and/or a connection failure. The technique disclosed in JP 11-297373 A requires a rivet. Thus, manufacturing a battery pack by using the technique disclosed in JP 11-297373 A unfortunately increases the weight and volume of the battery pack in accordance with the weight and size of the rivet, resulting in a reduction in the energy density of the battery pack.

Accordingly, preferable embodiments of the present application each provide a busbar that achieves high conduction reliability and prevents a reduction in energy density of a battery pack.

One preferable embodiment of the present application provides a busbar including: a first metallic member including a first plate portion; a second metallic member including a second plate portion; a swaged joint formed by plastically deforming the first plate portion of the first metallic member and the second plate portion of the second metallic member such that the first plate portion and the second plate portion are swaged together; and a metal joint formed by metal-joining the first plate portion of the first metallic member to the second plate portion of the second metallic member.

The busbar includes two types of joints, i.e., the swaged joint and the metal joint, which make connections in different ways. Thus, if vibrations and/or an impact, for example, are/is externally applied to the busbar, these joints would be likely to maintain intimate contact between the first metallic member and the second metallic member. Accordingly, a conductive connection between the first metallic member and the second metallic member is stably maintainable, resulting in increased conduction reliability of the busbar. The busbar requires no rivet and is thus able to prevent a reduction in energy density of a battery pack.

Another preferable embodiment of the present application provides the busbar, wherein the swaged joint includes a plastically deformed portion having a ring shape, and the metal joint is disposed inward of the plastically deformed portion in a plan view. The metal joint may be relatively lower in rigidity than (or more brittle than) the swaged joint. Disposing the metal joint inward of the plastically deformed portion maintains the joints in a stable condition, making it possible to maintain the conduction reliability of the busbar at a high level for a long period of time.

Still another preferable embodiment of the present application provides the busbar, wherein the first plate portion of the first metallic member has a rectangular shape, the swaged joint includes a plurality of swaged joints, the metal joint includes a plurality of metal joints, and the swaged joints and the metal joints are each disposed at least on an associated one of ends of the rectangular shape in a long-side direction thereof. This preferable embodiment is thus able to increase the strength of connection between the first metallic member and the second metallic member, resulting in an improvement in conduction reliability. This preferable embodiment also facilitates escape of gas and/or heat that may be generated during formation of the metal joints (e.g., when the first metallic member is welded to the second metallic member), making it possible to prevent a connection failure (e.g., a welding failure).

Yet another preferable embodiment of the present application provides the busbar, wherein the metal joint includes a plurality of fused and solidified portions provided in a form of comb teeth when viewed in cross section. Thus, if the first metallic member and the second metallic member are made of different metals, this preferable embodiment would reduce or prevent generation of an intermetallic compound. This preferable embodiment also produces an anchor effect that strengthens the metal joint.

Still yet another preferable embodiment of the present application provides the busbar, wherein the first metallic member and the second metallic member are made of different metals. In one example, the first metallic member consists mainly of aluminum, and the second metallic member consists mainly of copper.

Another preferable embodiment of the present application provides the busbar, wherein a surface of the second metallic member is plated with nickel or roughened with laser. This preferable embodiment is thus able to improve weldability when the metal joint is formed by welding the first metallic member to the second metallic member.

The busbar disclosed herein is suitable for use in electrically connecting a plurality of secondary batteries. Using the busbar disclosed herein provides a battery pack that exhibits high energy density and excellent reliability.

Still another preferable embodiment of the present application provides a battery pack including: at least two batteries each including a positive electrode terminal and a negative electrode terminal; and a busbar electrically connecting the positive electrode terminal of a first one of the batteries to the negative electrode terminal of a second one of the batteries. The battery pack exhibits excellent battery characteristics and reliability.

The above and other elements, features, steps, characteristics, and advantages of the present application will become more apparent from the following detailed description of the preferred embodiments with reference to the attached drawings.

DETAILED DESCRIPTION OF THE PREFERRED EMBODIMENTS

Preferred embodiments of techniques disclosed herein will be described below with reference to the drawings. Matters that are necessary for carrying out the present application but are not specifically mentioned herein (e.g., common battery pack structures and manufacturing processes that do not characterize the present application) may be understood by those skilled in the art as design matters based on techniques known in the related art. The present application may be carried out on the basis of the description provided herein and common technical knowledge in the related art.

Battery Pack 100

Figure 1:
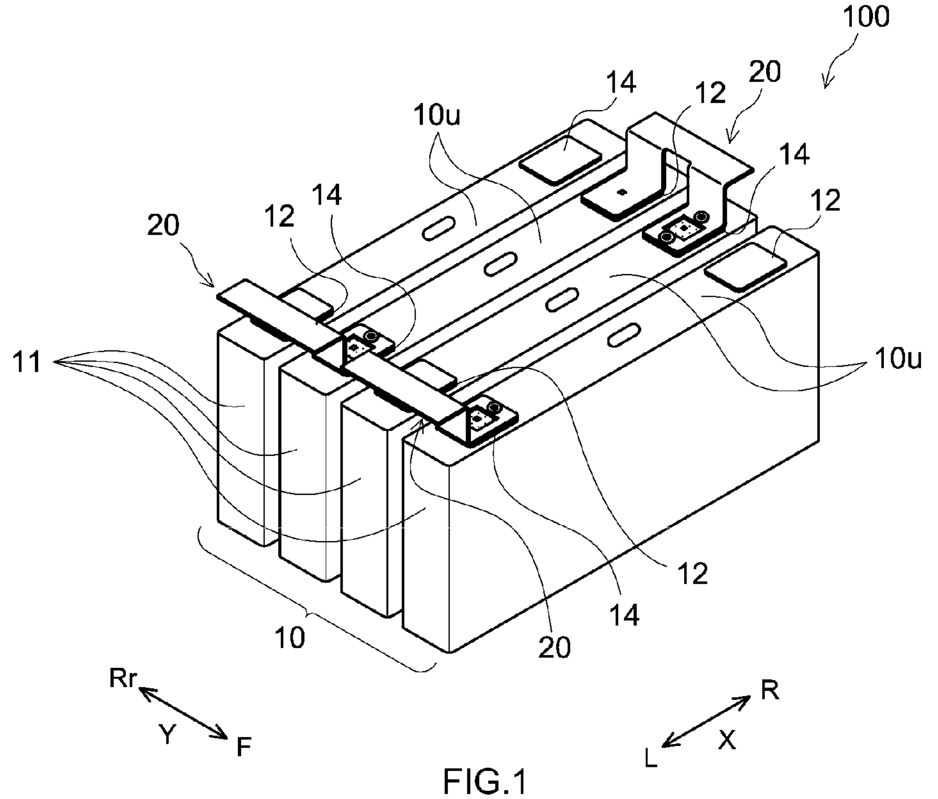
FIG. 1 is a schematic perspective view of a battery pack according to an embodiment of the present application.

FIG. 1 is a perspective view of a battery pack 100. The battery pack 100 includes: a plurality of batteries 10; and a plurality of busbars 20 electrically connecting the batteries 10 to each other. The busbars 20 are conductive connecting members. The number of busbars 20 included in the battery pack 100 typically corresponds to the number of batteries minus one.

Components and elements having the same functions are identified by the same reference signs in the drawings below, and description thereof may be simplified or omitted when deemed redundant. The reference signs U, D, F, Rr, L, and R in the drawings below respectively represent up, down, front, rear, left, and right. A direction in which the batteries 10 are arranged will hereinafter be referred to as an "arrangement direction Y". A direction perpendicular or substantially perpendicular to the arrangement direction Y and extending along the long sides of the batteries 10 will hereinafter be referred to as an "extension direction X". A height direction of the batteries 10 will hereinafter be referred to as a "height direction Z". These directions, however, are defined merely for the sake of convenience of description and do not limit in any way how the battery pack 100 may be installed.

The batteries 10 each have a flat rectangular shape. In the present embodiment, the batteries 10 are similar in shape. The batteries 10 are arranged side by side in the arrangement direction Y such that flat side surfaces (i.e., wide surfaces) of adjacent ones of the batteries 10 face each other. The batteries 10 may be bound together with a binder, such as a band. In the present embodiment, the batteries 10 are electrically connected to each other in series through the busbars 20. The batteries 10 included in the battery pack 100 may each have any other suitable shape and size. The battery pack 100 may include any other suitable number of batteries 10. The batteries 10 may each be located at any other suitable position. The batteries 10 may be connected to each other by any other suitable method. Heat-dissipating member(s) and/or spacer(s), for example, may be disposed between the batteries 10. The heat-dissipating member(s) serve(s) to efficiently dissipate heat generated by the batteries 10. The spacer(s) serve(s) as length adjuster(s).

As used herein, the term "battery" refers to any of various electricity storage devices from which electric energy is derivable, and is a concept encompassing primary batteries and secondary batteries. As used herein, the term "secondary battery" refers to any of various electricity storage devices that are repeatedly chargeable and dischargeable, and is a concept encompassing storage batteries (or chemical batteries), such as lithium ion secondary batteries and nickel-metal hydride batteries, and capacitors (or physical batteries), such as electric double layer capacitors.

The batteries 10 each include: a battery case 11 serving as a casing; and a power generating element (not illustrated) housed in the battery case 11. The batteries 10 may each be similar in structure to any battery known in the art or may each have any other suitable structure. The batteries 10 are typically secondary batteries. In the present embodiment, the batteries 10 are lithium ion secondary batteries. In the present embodiment, the battery cases 11 each have a flat cuboidal shape (or rectangular shape) with a bottom. Alternatively, the battery cases 11 may each have any other shape, such as a cylindrical shape. The battery cases 11 are each made of, for example, a lightweight, highly thermally conductive metal material, such as aluminum, an aluminum alloy, or stainless steel.

The power generating elements typically each include a positive electrode, a negative electrode, and an electrolyte. Although not illustrated, the positive electrodes each include a positive electrode collector and a positive electrode mixture layer fixed onto the positive electrode collector. The positive electrode collectors are each made of, for example, a conductive metal, such as aluminum, an aluminum alloy, nickel, or stainless steel. The positive electrode mixture layers each contain a positive electrode active material (e.g., a lithium transition metal composite oxide) that is able to reversibly store and discharge charge carriers. The negative electrodes each include a negative electrode collector and a negative electrode mixture layer fixed onto the negative electrode collector. The negative electrode collectors are each made of, for example, a conductive metal, such as copper, a copper alloy, nickel, or stainless steel. The negative electrode mixture layers each contain a negative electrode active material (e.g., a carbon material, such as graphite) that is able to reversibly store and discharge charge carriers. Each of the electrolytes is, for example, a nonaqueous electrolytic solution containing a nonaqueous solvent and a supporting electrolyte (such as a lithium salt). Alternatively, the electrolytes may each be in solid form (or may each be a solid electrolyte) and may each be integral with the associated positive electrode and negative electrode.

The batteries 10 each include an upper surface 10*u* to which a positive electrode terminal 12 and a negative electrode terminal 14 are attached. The positive electrode terminal 12 and the negative electrode terminal 14 of each battery 10 are each disposed on an associated one of the right and left ends of each battery 10 in the extension direction X (which corresponds to a right-left direction in FIG. 1). The positive electrode terminals 12 are each electrically connected to the positive electrode within the associated battery case 11. The positive electrode terminals 12 are each made of, for example, a metal, such as aluminum, an aluminum alloy, nickel, or stainless steel. The positive electrode terminals 12 may each be made of a metal similar to that used for the positive electrode collectors. The negative electrode terminals 14 are each electrically connected to the negative electrode within the associated battery case 11. The negative electrode terminals 14 are each made of, for example, a metal, such as copper, a copper alloy, nickel, or stainless steel. The negative electrode terminals 14 may each be made of a metal similar to that used for the negative electrode collectors. The batteries 10 are each charged and discharged through the associated positive electrode terminal 12 and the associated negative electrode terminal 14.

In the present embodiment, the positive electrode terminals 12 and the negative electrode terminals 14 each include an upper end having a rectangular flat plate shape. The positive electrode terminal 12 and the negative electrode terminal 14 of each battery 10 each include a flat surface parallel or substantially parallel to the upper surface 10*u* of each battery 10. In the present embodiment, the positive electrode terminals 12 and the negative electrode terminals 14 are each longer in the extension direction X than in the arrangement direction Y. Alternatively, the positive electrode terminals 12 and the negative electrode terminals 14 may each have any other suitable shape and size. The positive electrode terminals 12 and the negative electrode terminals 14 may each be located at any other suitable position. The positive electrode terminals 12 and the negative electrode terminals 14 of the batteries 10 adjacent to each other in the arrangement direction Y are connected to each other through the busbars 20.

The busbars 20 are metallic members used to make electric connections between the batteries 10. In the present embodiment, the busbars 20 each make an electric connection between the positive electrode terminal 12 of a first one of the batteries 10 and the negative electrode terminal 14 of a second one of the batteries 10, which are adjacent to each other in the arrangement direction Y. In the present embodiment, the busbars 20 are disposed such that the busbars 20 each cover the flat surfaces of the associated positive electrode terminal 12 and the associated negative electrode terminal 14. The busbars 20 may each be connected to the flat surfaces of the associated positive electrode terminal 12 and the associated negative electrode terminal 14 by, for example, a connecting method known in the art, such as laser welding. In this case, welded joints (not illustrated) are formed at the connections between each busbar 20 and the flat surfaces of the associated positive electrode terminal 12 and the associated negative electrode terminal 14. The busbars 20 are thus each integral with the associated positive electrode terminal 12 and the associated negative electrode terminal 14.

Figure 2:
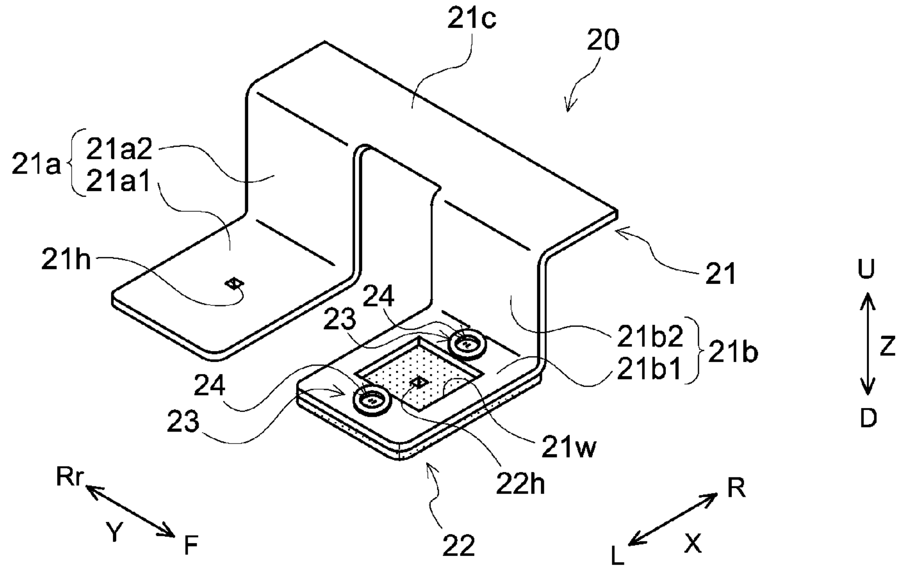
FIG. 2 is a schematic perspective view of one of busbars illustrated in FIG. 1.
Figure 3:
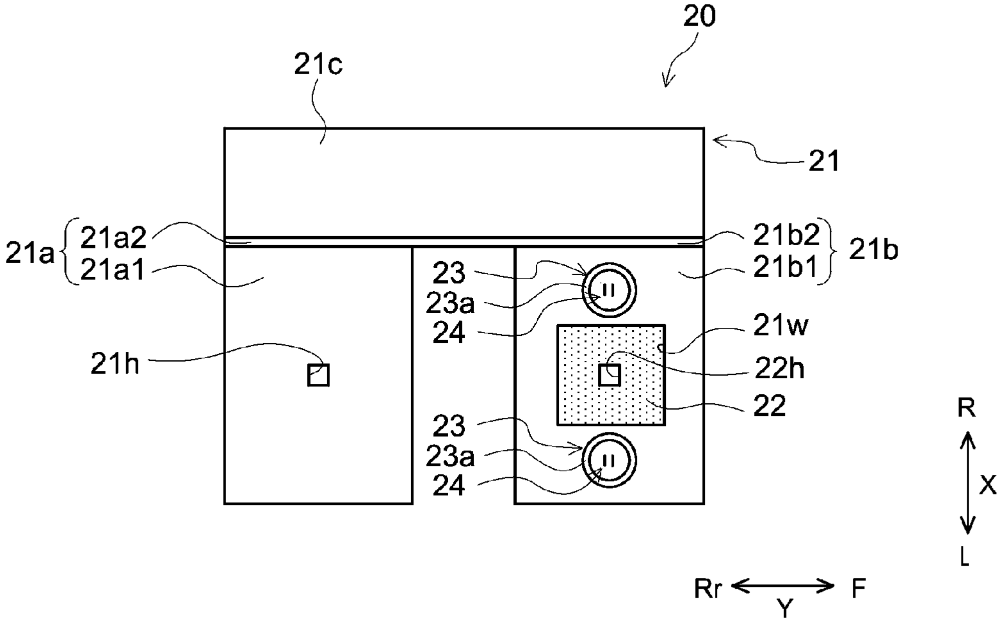
FIG. 3 is a schematic plan view of one of the busbars illustrated in FIG. 1.
Figure 4:
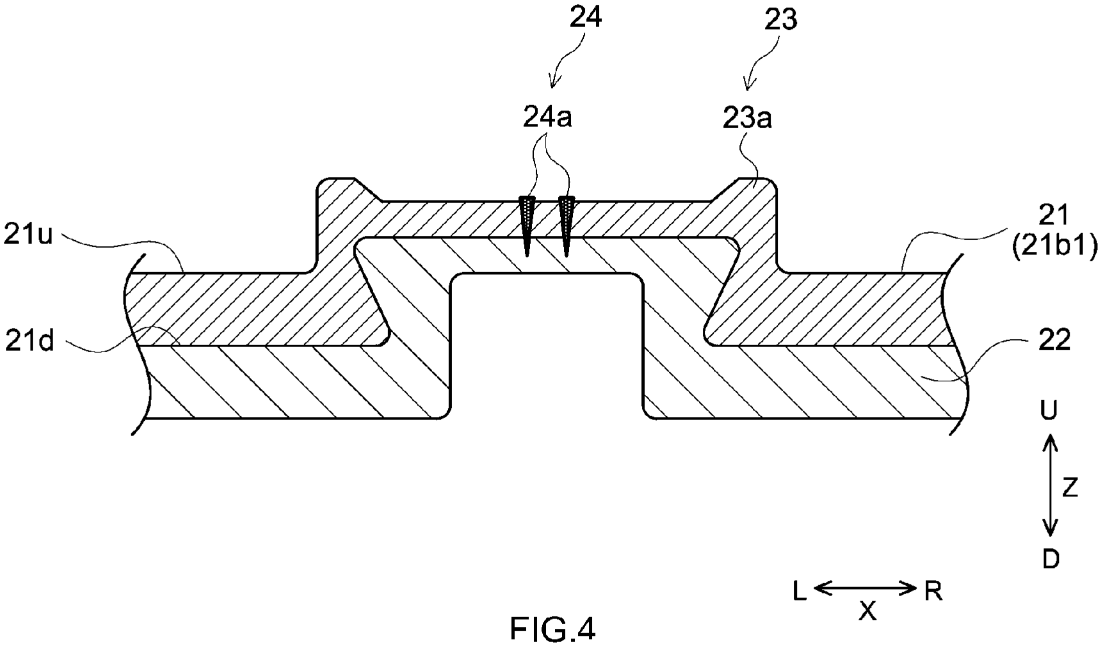
FIG. 4 is a schematic vertical cross-sectional view of main components of one of the busbars illustrated in FIG. 1.

FIG. 2 is a perspective view of one of the busbars 20 illustrated in FIG. 1. FIG. 3 is a plan view of one of the busbars 20 illustrated in FIG. 1. FIG. 4 is a vertical cross-sectional view of main components of one of the busbars 20 illustrated in FIG. 1. As illustrated in FIGS. 2 and 3, each busbar 20 in the present embodiment includes a first metallic member 21, a second metallic member 22, a plurality of swaged joints 23, and a plurality of metal joints 24. The first metallic member 21 and the second metallic member 22 of each busbar 20 are integral with each other through the swaged joints 23 and the metal joints 24 and are thus electrically connected to each other.

The first metallic member 21 is conductively connected to the positive electrode terminal 12 of the associated battery 10. The first metallic member 21 is made of, for example, a conductive metal, such as aluminum, an aluminum alloy, nickel, or stainless steel. The first metallic member 21 preferably consists mainly of aluminum. In the present embodiment, the first metallic member 21 is made of aluminum. The first metallic member 21 is preferably made of a metal similar to that used for the positive electrode terminals 12 or an alloy whose first component is a metallic element similar to that used for the positive electrode terminals 12. As used herein, the term “first component” refers to a component whose percentage by mass is the highest among the components of an alloy. The first metallic member 21 is formed by, for example, bending a metallic plate by press working.

The first metallic member 21 includes: a first connection 21*a* connected to the associated positive electrode terminal 12; a second connection 21*b* connected to the second metallic member 22 having a flat plate shape, and a connector 21*c* through which the first connection 21*a* and the second connection 21*b* are connected to each other. The connector 21*c* extends in the arrangement direction Y. In the present embodiment, the connector 21*c* has a flat plate shape. Alternatively, the connector 21*c* may include a bent portion, such as a U-shaped portion, a V-shaped portion, or a corrugated portion. In the plan view of FIG. 3, the first connection 21*a* and the second connection 21*b* each extend in the extension direction X from an associated one of the ends of the connector 21*c* facing in the arrangement direction Y. As illustrated in FIG. 2, the first connection 21*a* and the second connection 21*b* are each L-shaped.

The first connection 21*a* includes: a plate portion 21*a*1 extending along the flat surface of the associated positive electrode terminal 12; and an extended portion 21*a*2 extending from the plate portion 21*a*1 to the connector 21*c*. The plate portion 21*a*1 is in abutment with the associated positive electrode terminal 12. In the present embodiment, the plate portion 21*a*1 has a substantially rectangular outer shape. In the plan view, the plate portion 21*a*1 is preferably substantially similar in outer shape to or smaller in outer shape than the flat surface of the associated positive electrode terminal 12. The plate portion 21*a*1 has a thickness of between about 0.01 mm and about 5 mm. In one example, the plate portion 21*a*1 has a thickness of between about 0.1 mm and about 1 mm. Alternatively, the plate portion 21*a*1 may have any other suitable shape, size, and thickness.

The plate portion 21*a*1 includes a through hole 21*h* passing through the plate portion 21*a*1 in the height direction Z. The through hole 21*h* is defined in the center of the plate portion 21*a*1. In the present embodiment, the through hole 21*h* has a substantially quadrangular shape (e.g., a substantially rectangular shape) in the plan view. The through hole 21*h* serves as a guide indicating a position where the plate portion 21*a*1 is to be welded to the flat surface of the associated positive electrode terminal 12. The through hole 21*h* may also function as an escape route for gas and/or heat generated when the plate portion 21*a*1 is welded to the flat surface of the associated positive electrode terminal 12.

The second connection 21*b* includes: a plate portion 21*b*1 extending along the second metallic member 22 having a flat plate shape, and an extended portion 21*b*2 extending from the plate portion 21*b*1 to the connector 21*c*. In the present embodiment, the plate portion 21*b*1 has a substantially rectangular outer shape. The plate portion 21*b*1 may be similar in outer shape to the plate portion 21*a*1. In the plan view, the plate portion **21*b*1 is preferably substantially similar in outer shape to or smaller in outer shape than the second metallic member 22. The plate portion 21*b*1 has a thickness of between about 0.01 mm and about 5 mm. In one example, the plate portion 21*b*1 has a thickness of between about 0.1 mm and about 1 mm. Alternatively, the plate portion 21*b*1** may have any other suitable shape, size, and thickness.

The plate portion **21*b*1 includes a window 21*w* passing through the plate portion 21*b*1 in the height direction Z. The window 21*w* is defined in the center of the plate portion 21*b*1. The window 21*w* is located between the swaged joints 23 in the extension direction X. In the present embodiment, the window 21*w* has a substantially quadrangular shape (e.g., a substantially rectangular shape) in the plan view. The second metallic member 22 is exposed through the window 21*w*** in the plan view.

The second metallic member 22 is conductively connected to the negative electrode terminal 14 of the associated battery 10. The second metallic member 22 is made of, for example, a conductive metal, such as copper, a copper alloy, nickel, or stainless steel. The second metallic member 22 may contain, for example, a first component that is a metal similar to or different from that used for the first metallic member 21. In the present embodiment, the second metallic member 22 is made of a metal different from that used for the first metallic member 21. The second metallic member 22 preferably consists mainly of copper. In the present embodiment, the second metallic member 22 is made of copper. The second metallic member 22 is preferably made of a metal similar to that used for the negative electrode terminals 14 or an alloy whose first component is a metallic element similar to that used for the negative electrode terminals 14. A surface of the second metallic member 22 may be coated with a metal, such as nickel. The surface of the second metallic member 22 may be roughened with laser. The second metallic member 22 is preferably plated with nickel or roughened with laser. This improves weldability when the metal joints 24 are formed by welding the first metallic member 21 to the second metallic member 22.

In the present embodiment, the second metallic member 22 has a flat plate shape. In the present embodiment, the second metallic member 22 is a plate member. The second metallic member 22 includes: a first surface (i.e., an upper surface in FIG. 2) in abutment with the second connection **21*b* of the first metallic member 21; and a second surface (i.e., a lower surface in FIG. 2) in abutment with the associated negative electrode terminal 14. In the present embodiment, the second metallic member 22 has a substantially rectangular outer shape. In the plan view, the second metallic member 22 is preferably substantially similar in outer shape to or smaller in outer shape than the flat surface of the associated negative electrode terminal 14. The second metallic member 22 has a thickness of between about 0.01 mm and about 5 mm. In one example, the second metallic member 22 has a thickness of between about 0.1 mm and about 1 mm. Alternatively, the second metallic member 22** may have any other suitable shape, size, and thickness.

The second metallic member 22 includes a through hole **22*h* passing through the second metallic member 22 in the height direction Z. The through hole 22*h* is defined in the center of the second metallic member 22. In the present embodiment, the through hole 22*h* has a substantially quadrangular shape (e.g., a substantially rectangular shape) in the plan view. The through hole 22*h* is substantially similar in size to the through hole 21*h* of the first metallic member 21. The through hole 22*h* serves as a guide indicating a position where the second metallic member 22 is to be welded to the flat surface of the associated negative electrode terminal 14. The through hole 22*h* may also function as an escape route for gas and/or heat generated when the second metallic member 22 is welded to the flat surface of the associated negative electrode terminal 14**.

As illustrated in FIG. 4, the swaged joints 23 are each formed by plastically deforming the plate portion **21*b*1 of the first metallic member 21 and the second metallic member 22 having a flat plate shape, such that the plate portion 21*b*1 and the second metallic member 22 are swaged together. Thus, if the first metallic member 21 and the second metallic member 22 are made of, for example, different metals, the first metallic member 21 and the second metallic member 22 would be suitably connected to each other without using any rivet. Forming the swaged joints 23 enables a reduction in the resistance of the resulting busbar 20. As is clear from FIGS. 3 and 4, the swaged joints 23 in the present embodiment each have a substantially cylindrical outer shape. As illustrated in FIG. 3, the swaged joints 23 each have a substantially circular shape in the plan view. Alternatively, the swaged joints 23 may each have any other suitable shape. The swaged joints 23** may each have, for example, a substantially quadrangular shape, an elliptically cylindrical shape, or a gourd shape including two circles or ellipses continuous with each other. As used herein, the term "substantially quadrangular shape" refers to not only a perfect quadrangular shape (e.g., a rectangular shape or a square shape) but also various other substantially quadrangular shapes, such as a substantially quadrangular shape whose corners are rounded.

In the present embodiment, the number of swaged joints 23 included in each busbar 20 is more than one as illustrated in FIG. 3. Specifically, the number of swaged joints 23 included in each busbar 20 is two in the present embodiment. Alternatively, the number of swaged joints 23 included in each busbar 20 may be one or may be three or more. In the present embodiment, the two swaged joints 23 included in each busbar 20 are each disposed on an associated one of the ends of the plate portion **21*b*1 of the first metallic member 21 in the extension direction X. The extension direction X is an example of a "long-side direction of the rectangular shape". Forming the swaged joints 23 increases the strength of connection 1'2 between the first metallic member 21 and the second metallic member 22, resulting in an improvement in conduction reliability. Alternatively, the swaged joints 23 may be disposed on the four corners of the plate portion 21*b*1 of the first metallic member 21. The two swaged joints 23 included in each busbar 20 are disposed outward of the window 21*w* in the plan view. The two swaged joints 23 included in each busbar 20 are disposed such that the window 21*w* is located between the swaged joints 23 in the extension direction X. As illustrated in FIGS. 3 and 4, the swaged joints 23 each include a plastically deformed portion 23*a* having a ring shape (e.g., a substantially annular shape) in the plan view. This increases the strength of the swaged joints 23**.

The metal joints 24 are formed by metal-joining the plate portion **21*b*1 of the first metallic member 21 to the second metallic member 22 having a flat plate shape. The metal joints 24 may be relatively lower in rigidity than (or more brittle than) the swaged joints 23. The metal joints 24 are preferably welded joints formed by welding. As illustrated in FIG. 4, the metal joints 24 in the present embodiment are each disposed inward of the associated swaged joint 23 (or more specifically, inward of the associated plastically deformed portion 23*a* having an annular shape). To be more specific, the metal joints 24 are each disposed at and/or near the center of a circle formed by the associated plastically deformed portion 23***a* having an annular shape. The metal joints 24 are thus maintained in a stable condition, making it possible to maintain the conduction reliability of the busbar 20 at a high level for a long period of time.

In the present embodiment, the metal joints 24 are each disposed inward of an associated one of the two swaged joints 23 as illustrated in FIG. 3. The number of metal joints 24 is equal to the number of swaged joints 23. The number of metal joints 24 included in each busbar 20 is more than one. Specifically, the number of metal joints 24 included in each busbar 20 is two in the present embodiment. The number of metal joints 24 does not necessarily have to be equal to the number of swaged joints 23. Alternatively, the number of metal joints 24 included in each busbar 20 may be one or may be three or more. The metal joints 24 may each be disposed away from an associated one of the swaged joints 23. In the present embodiment, the two metal joints 24 included in each busbar 20 are each disposed on an associated one of the ends of the plate portion 21*b*1 of the first metallic member 21 in the extension direction X. Disposing the metal joints 24 in this manner facilitates escape of gas and/or heat that may be generated during formation of the metal joints 24 (e.g., when the first metallic member 21 is welded to the second metallic member 22), making it possible to prevent a connection failure (e.g., a welding failure). Alternatively, the metal joints 24 may be disposed on the four corners of the plate portion 21*b*1 of the first metallic member 21. The two metal joints 24 included in each busbar 20 are disposed outward of the window 21*w* in the plan view. The two metal joints 24 included in each busbar 20 are disposed such that the window 21*w* is located between the metal joints 24 in the extension direction X.

As illustrated in FIG. 4, the metal joints 24 each include a plurality of fused and solidified portions 24*a* when viewed in cross section. The fused and solidified portions 24*a* are provided in the form of comb teeth. Thus, if the first metallic member 21 and the second metallic member 22 are made of different metals, generation of an intermetallic compound would be reduced or prevented. Providing the fused and solidified portions 24*a* produces an anchor effect that strengthens the metal joints 24. The fused and solidified portions 24*a* are each in the form of an inverted triangle extending from the first metallic member 21 to the second metallic member 22 (i.e., downward in FIG. 4). When viewed in cross section, a width of each fused and solidified portion 24*a* at a first surface 21*u* of the first metallic member 21 (which is an upper surface of the first metallic member 21 in FIG. 4) is greater than a width of each fused and solidified portion 24*a* at a second surface 21*d* of the first metallic member 21 (which is a lower surface of the first metallic member 21 in FIG. 4 and is a surface of the first metallic member 21 in contact with the second metallic member 22). A depth of each fused and solidified portion 24*a* (which is a length of each fused and solidified portion 24*a* in the height direction Z) is greater than a thickness of the plate portion 21*b*1 of the first metallic member 21. The fused and solidified portions 24*a* may each have any depth. The fused and solidified portions 24*a* may each have a depth of between about 10 μm and about 1000 μm. In one example, the fused and solidified portions 24*a* may each have a depth of between 50 μm and 500 μm. The fused and solidified portions 24*a* preferably each have a depth of between about 100 μm and about 300 μm. The fused and solidified portions 24*a* may each have a diameter (or a spot diameter) of between about 5 μm and about 200 μm in the plan view. In one example, the fused and solidified portions 24*a* may each have a diameter (or a spot diameter) of between about 10 μm and about 100 μm in the plan view. In the present embodiment, the fused and solidified portions 24*a* each have a depth of about 150 μm and a spot diameter of about 30 μm.

Method for Manufacturing Busbar 20

The busbars 20 may each be manufactured by any method. The busbars 20 may each be manufactured by, for example, a manufacturing method that involves preparing the first metallic member 21 and the second metallic member 22, which have been described above, and that includes a swaging step and a metal-joining step. The swaging step and the metal-joining step are typically performed in this order. Alternatively, the swaging step may be performed after the metal-joining step. The manufacturing method disclosed herein may further include any other step(s) at any stage(s).

The swaging step involves forming the swaged joints 23 by plastically deforming the plate portion 21*b*1 of the first metallic member 21 and the second metallic member 22 having a flat plate shape. The swaged joints 23 may be suitably formed by performing swaging using, for example, tools known in the art (such as tools available from TOX® PRESSOTECHNIK). Performing swaging using tools (such as a punch and a die) available from TOX® PRESSOTECHNIK involves compressing the first metallic member 21 and the second metallic member 22 between the punch and the die so as to form the plastically deformed portions 23*a* each having an annular shape. Thus, the first metallic member 21 and the second metallic member 22 are suitably joined to each by cold forming without using any heat. If the first metallic member 21 and the second metallic member 22 are made of different metals, the first metallic member 21 and the second metallic member 22 would be suitably joined to each other. Performing swaging using tools available from TOX® PRESSOTECHNIK makes it unlikely that nickel plating on a surface of the second metallic member 22 will come off, making it possible to stably weld the second metallic member 22 to the busbar 20 in manufacturing a battery pack.

The plastically deformed portions 23*a* may each have any suitable inside diameter (or any punch diameter) and any suitable outside diameter (or any die diameter). The plastically deformed portions 23*a* preferably each have an inside diameter (or a punch diameter) of between 1.0 mm and 4.0 mm. The plastically deformed portions 23*a* preferably each have an outside diameter (or a die diameter) of between 1.5 mm and 5.0 mm. A swaging pressure may be any suitable pressure. The swaging pressure is preferably between 500 N and 2500 N. Thus, the swaged joints 23 are stably formed such that the strength of connection between the first metallic member 21 and the second metallic member 22 is increased.

The metal-joining step involves forming the metal joints 24 by metal-joining (i.e., metallurgically connecting) the plate portion 21*b*1 of the first metallic member 21 to the second metallic member 22 having a flat plate shape. Performing the metal-joining step after the swaging step makes it possible to accurately form the metal joints 24 stable in shape. The metal joints 24 may be formed by any method known in the art using, for example, light energy, electronic energy, or thermal energy. The metal joints 24 may be formed by, for example, welding, fusion welding, pressure welding, thermocompression bonding, or brazing. The metal joints 24 are particularly preferably formed by welding, such as laser welding, ultrasonic welding, electron beam welding, resistance welding, or tungsten inert gas (TIG) welding.

Such welding makes it possible to stably form the metal joints 24 of high strength and low resistance.

The metal joints 24 may be formed by, for example, performing welding that involves applying laser light to areas where the plate portion **21*b*1 of the first metallic member 21 and the second metallic member 22 having a flat plate shape are placed on top of another, such that the laser light passes through the first metallic member 21. In the present embodiment, the metal joints 24 are each formed inward of the plastically deformed portion 23*a* (which has an annular shape) of the associated swaged joint 23 or, in particular, at and/or near the center of a circle formed by the plastically deformed portion 23*a* of the associated swaged joint 23. The present embodiment thus makes it unlikely that positions where the plate portion 21*b*1 is to be welded to the second metallic member 22 will deviate, resulting in an improvement in workability. In addition, the present embodiment is able to improve weldability when the metal joints 24** are to be formed by welding.

The metal joints 24 are each formed continuously or discontinuously. In one example, the fused and solidified portions **24*a* are preferably formed by using one-spot nano-pulse laser such that the fused and solidified portions 24*a* each have a narrow width and a great fusion depth. Laser application conditions may be suitably set in accordance with any technique known in the art (e.g., the technique disclosed in JP 2020-203315 A) such that the fused and solidified portions 24*a* have desired widths and fusion depths. The fused and solidified portions 24*a* may be formed by applying laser under any suitable conditions. When nano-pulse laser is to be used, a laser output is preferably between 5 kW and 13 kW, a laser spot diameter is preferably between 20 μm and 400 μm, a pulse application time is preferably between 1 psec and 1000 psec, a laser frequency is preferably 10 kHz and 250 kHz, and a laser wavelength is preferably between 100 nm and 2000 nm (e.g., 1060 nm). Applying one-spot laser twice or more (2 times or more, for example two to ten times) under such conditions makes it possible to form the fused and solidified portions 24*a* having shapes and/or sizes described above, such that the metal joints 24** are provided in the form of comb teeth.

Method for Manufacturing Battery Pack 100

The battery pack 100 may be manufactured by, for example, a manufacturing method involving: preparing the batteries 10 and the busbar 20, which have been described above, and electrically connecting the positive electrode terminal 12 of a first one of the batteries 10 to the negative electrode terminal 14 of a second one of the batteries 10 through the busbar 20. Specifically, the plate portion **21*a*1 of the busbar 20 is placed on the flat surface of the positive electrode terminal 12 of the first one of the batteries 10, the plate portion 21*a*1 is positioned using the through hole 21*h*, and then the plate portion 21*a*1 of the busbar 20 is laser-welded to the positive electrode terminal 12. Similarly, the plate portion 21*b*1 of the busbar 20 and the second metallic member 22 are placed on the flat surface of the negative electrode terminal 14 of the second one of the batteries 10, the plate portion 21*b*1 and the second metallic member 22 are positioned using the through hole 22*h*, and then the second metallic member 22 exposed through the window 21*w* defined in the plate portion 21*b*1 is laser-welded to the negative electrode terminal 14. When the second metallic member 22 is laser-welded to the negative electrode terminal 14**, a laser wavelength is preferably 540 nm or less. This results in an improvement in weldability.

Purpose of Use of Battery Pack 100

The battery pack 100 is usable for various purposes. The battery pack 100 is suitably usable for purposes that may involve application of external force (such as vibrations and/or an impact) during use. The battery pack 100 may typically find suitable use as a motor power source (e.g., a driving power source) to be installed on any of various vehicles (e.g., a passenger car and a truck). The battery pack 100 may be installed on any type of vehicle, examples of which include, but are not limited to, a plug-in hybrid electric vehicle (PHEV), a hybrid electric vehicle (HEV), and a battery electric vehicle (BEV).

Although the preferred embodiment of the present application has been described thus far, the foregoing embodiment is only illustrative, and the present application may be embodied in various other forms. The present application may be practiced based on the disclosure of this specification and technical common knowledge in the related field. The techniques described in the claims include various changes and modifications made to the embodiment illustrated above. Any or some of the technical features of the foregoing embodiment, for example, may be replaced with any or some of the technical features of variations of the foregoing embodiment. Any or some of the technical features of the variations may be added to the technical features of the foregoing embodiment. Unless described as being essential, the technical feature(s) may be optional.

As described above, specific embodiments of the techniques disclosed herein include those described in clauses below.

Clause 1: A busbar including: a first metallic member including a first plate portion; a second metallic member including a second plate portion; a swaged joint formed by plastically deforming the first plate portion of the first metallic member and the second plate portion of the second metallic member such that the first plate portion and the second plate portion are swaged together; and a metal joint formed by metal-joining the first plate portion of the first metallic member to the second plate portion of the second metallic member.

Clause 2: The busbar according to clause 1, wherein the swaged joint includes a plastically deformed portion having a ring shape, and the metal joint is disposed inward of the plastically deformed portion in a plan view.

Clause 3: The busbar according to clause 1 or 2, wherein the first plate portion of the first metallic member has a rectangular shape, the swaged joint includes a plurality of swaged joints, the metal joint includes a plurality of metal joints, and the swaged joints and the metal joints are each disposed at least on an associated one of ends of the rectangular shape in a long-side direction thereof.

Clause 4: The busbar according to any one of clauses 1 to 3, wherein the metal joint or the metal joints includes or include a plurality of fused and solidified portions provided in a form of comb teeth when viewed in cross section.

Clause 5: The busbar according to any one of clauses 1 to 4, wherein the first metallic member and the second metallic member are made of different metals.

Clause 6: The busbar according to any one of clauses 1 to 5, wherein the first metallic member consists mainly of aluminum, and the second metallic member consists mainly of copper.

Clause 7: The busbar according to clause 6, wherein a surface of the second metallic member is plated with nickel or roughened with laser.

Clause 8: The busbar according to any one of clauses 1 to 7, wherein the busbar is for use in electrically connecting a plurality of batteries.

REFERENCE SIGNS LIST

10 battery
12 positive electrode terminal
14 negative electrode terminal
20 busbar
21 first metallic member
21*a* first connection
21*a*1 plate portion
21*a*2 extended portion
21*b* second connection
21*b*1 plate portion
21*b*2 extended portion
21*c* connector
21*h* through hole
21*w* window
22 second metallic member
22*h* through hole
23 swaged joint
23*a* plastically deformed portion
24 metal joint
24*a* fused and solidified portion
100 battery pack

What is claimed is:

1. A battery pack comprising:

at least two batteries each including a positive electrode terminal and a negative electrode terminal; and a busbar electrically connecting the positive electrode terminal of a first one of the batteries to the negative electrode terminal of a second one of the batteries, wherein the busbar includes a first metallic member including a first plate portion, with a window defined through the first plate portion in a thickness direction of the first plate portion, a second metallic member that is a plate member, a swaged joint formed by plastically deforming the first plate portion of the first metallic member and a portion of the second metallic member to form a plastically deformed portion such that the first plate portion and the portion of the second metallic member are swaged together, wherein the swaged joint includes a plurality of swaged joints facing each other with the window of the first plate portion sandwiched in between the plurality of swaged joints in at least one direction, and a metal joint formed by metal-joining the first plate portion of the first metallic member to the portion of the second metallic member to form a fused and solidified portion.

2. A busbar comprising:

a first metallic member including a first plate portion, with a window defined through the first plate portion in a thickness direction of the first plate portion;

a second metallic member that is a olate member;

a swaged joint formed by plastically deforming the first plate portion of the first metallic member and a portion of the second metallic member to form a plastically deformed portion such that the first plate portion and the portion of the second metallic member are swaged together, wherein the swaged joint includes a plurality of swaged joints facing each other with the window of the first plate portion sandwiched in between the plurality of swaged joints in at least one direction; and a metal joint formed by metal-joining the first plate portion of the first metallic member to the portion of the second metallic member to form a fused and solidified portion.

3. The busbar according to claim 2, wherein the swaged joint includes a plastically deformed portion having a ring shape, and the metal joint is disposed inward of the plastically deformed portion in a plan view.

4. The busbar according to claim 2, wherein the first plate portion of the first metallic member has a rectangular shape, the swaged joint includes a plurality of swaged joints, the metal joint includes a plurality of metal joints, and the plurality of swaged joints and the plurality of metal joints are each disposed at least on one end of the rectangular shape in a long-side direction thereof.

5. The busbar according to claim 2, wherein the metal joint includes a plurality of fused and solidified portions provided in a form of comb teeth when viewed in cross section.

6. The busbar according to claim 2, wherein the first metallic member and the second metallic member are made of different metals.

7. The busbar according to claim 2, wherein the first metallic member consists mainly of aluminum, and the second metallic member consists mainly of copper.

8. The busbar according to claim 7, wherein a surface of the second metallic member is plated with nickel or roughened with laser.

9. The busbar according to claim 2, wherein the busbar is for use in electrically connecting a plurality of batteries.

10. The busbar according to claim 2, wherein the plurality of swaged joints are each arranged such that they are spaced away from the window.

* * * * *